US010896457B2

(12) United States Patent
Arnett et al.

(10) Patent No.: US 10,896,457 B2
(45) Date of Patent: Jan. 19, 2021

(54) SYNCHRONIZED AUDIOVISUAL RESPONSES TO USER REQUESTS

(71) Applicant: Amazon Technologies, Inc., Seattle, WA (US)

(72) Inventors: Jon Arnett, Seattle, WA (US); Alexey Budnik, Castro Valley, CA (US); Philip Douglas Bozak, Seattle, WA (US); Jackie Davis Goldberg, Tarzana, CA (US); Bennett Wilson Hornbostel, Seattle, WA (US); Robert Katz, Shoreline, WA (US); Andrew Samuel Li, Seattle, WA (US); Vander McClain, Seattle, WA (US); Chee Kiat Ng, Bellevue, WA (US); Allana Pritchard, Seattle, WA (US); Amy Jane Scrivanich, Seattle, WA (US); Xiaobin Zhang, Bellevue, WA (US); Chris David Ziemba, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 322 days.

(21) Appl. No.: 15/839,689

(22) Filed: Dec. 12, 2017

(65) Prior Publication Data

US 2019/0180343 A1    Jun. 13, 2019

(51) Int. Cl.
*G06Q 30/06* (2012.01)
*G06F 16/951* (2019.01)
(Continued)

(52) U.S. Cl.
CPC ....... *G06Q 30/0625* (2013.01); *G06F 16/951* (2019.01); *G06Q 30/0633* (2013.01);
(Continued)

(58) Field of Classification Search
CPC ........................... G10L 15/22; G06Q 30/0633
(Continued)

(56) References Cited

U.S. PATENT DOCUMENTS

| 7,558,744 B2 | 7/2009 | Razumov | |
|---|---|---|---|
| 2009/0073176 A1* | 3/2009 | Pirchio | G11B 27/00 345/501 |

(Continued)

FOREIGN PATENT DOCUMENTS

WO    WO 2006/054126    5/2006

OTHER PUBLICATIONS

Mattheyses, Wesley, and Werner Verhelst. "Audiovisual Speech Synthesis: an Overview of the State-of-the-Art." Speech Communication 66 (2015): 182-217. ProQuest. Web. Sep. 9, 2020. (Year: 2015).*

(Continued)

*Primary Examiner* — Marissa Thein
*Assistant Examiner* — Latasha D Ramphal
(74) *Attorney, Agent, or Firm* — Knobbe, Martens, Olson and Bear, LLP

(57) ABSTRACT

Systems and methods are disclosed related to presenting an interactive audiovisual presentation that provides a user with information regarding individual items matching a user's search request or other request that results in a set of items. The audiovisual content may be generated to include a summary of a subset of item attributes associated with the individual items, and may include both an audio summary and visual content that are presented in synchronization with each other based on markup information in a presentation file.

20 Claims, 7 Drawing Sheets

(51) Int. Cl.
  *G10L 15/22* (2006.01)
  *G10L 15/30* (2013.01)
(52) U.S. Cl.
  CPC .......... *G06Q 30/0643* (2013.01); *G10L 15/22* (2013.01); *G10L 15/30* (2013.01)
(58) Field of Classification Search
  USPC .................................................... 705/26–27
  See application file for complete search history.

(56) References Cited

U.S. PATENT DOCUMENTS

| | | | |
|---|---|---|---|
| 2013/0066750 A1* | 3/2013 | Siddique | G06Q 10/0637 705/27.2 |
| 2014/0074664 A1 | 3/2014 | Amsalem | |
| 2015/0332666 A1 | 11/2015 | Dayan et al. | |
| 2016/0110783 A1 | 4/2016 | Lee et al. | |
| 2017/0171125 A1 | 6/2017 | Chow | |
| 2017/0178626 A1 | 6/2017 | Gruber et al. | |

OTHER PUBLICATIONS

Herrman, John, 'As Online Video Surges, Publishers Turn to Automation,' The New York Times, https://www.nytimes.com/2016/07/11/business/media/as-online-video-surges-publishers-turn-to-automation.html, dated Jul. 10, 2016, accessed on Mar. 5, 2018.
Videolicious, 'Use Videolicious to help agents make and edit real estate video,' https://videolicious.com/real-estate-video, accessed on Mar. 5, 2018.

* cited by examiner

SYNCHRONIZED AUDIOVISUAL RESPONSES TO USER REQUESTS

BACKGROUND

Electronic devices, such as voice-enabled computing devices, are capable of performing various functions. For instance, an individual may speak a command to activate such a device and in response, the device may perform various functions and/or cause one or more actions to be performed. Some voice-enabled devices may also include speakers, display screens, and the like for presentation of content. Some voice-enabled devices may be implemented within a distributed system that provides these devices, as remote clients, with access to various services that are implemented largely within the distributed system and that are accessible via a network. These network-accessible services may enable remote client devices to access or provide additional functionality or computing power not available locally on the devices.

BRIEF DESCRIPTION OF DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1A:
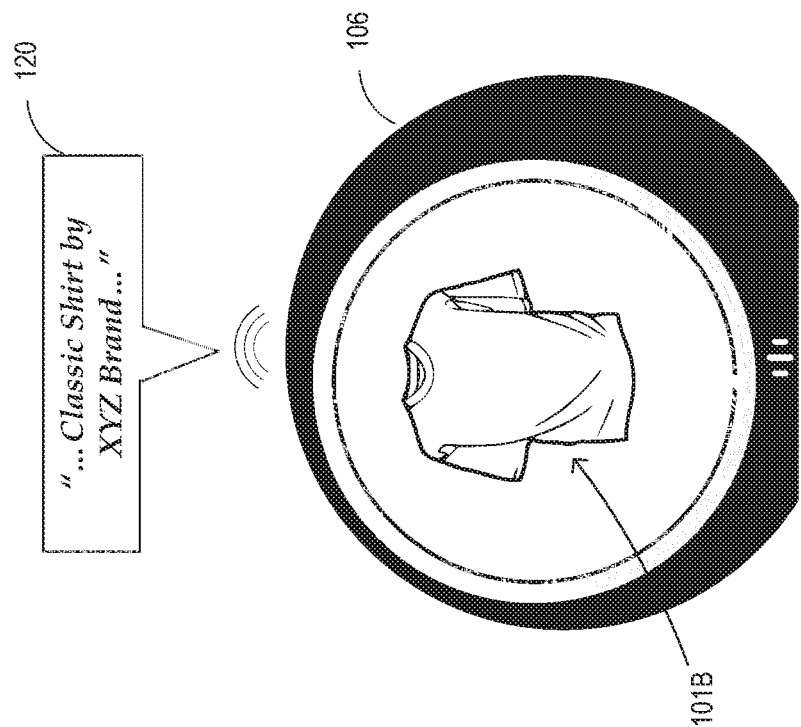
FIGS. 1A-1D depict a voice-enabled device presenting a synchronized visual and audio presentation in response to a user's spoken request for item search results, according to one embodiment.

Aspects of at least some embodiments of the present disclosure relate to generating an interactive audiovisual presentation that provides a user with a summary of information regarding one or more items, such as products listed in an electronic catalog. For example, in response to a user's spoken search request for item details of an item or for a list of items using a voice-enabled device, a dynamic audiovisual presentation may be generated and presented that includes a summary of a system-selected subset of item details of one or more items matching the user's request. The presentation may include a spoken audio summary presented in synchronization with corresponding visual content (such as an item image, price, ratings, reviews, color, size, brand, seller, description, and/or other information) based on markup information in a generated presentation file. In some embodiments, the user may respond by voice or touchscreen input at any time during the presentation to request more information or perform an action, such as requesting to purchase a specific presented item. Accordingly, the user may be provided with an interactive, speech-based response to a spoken query or request, and the response may include display of supporting visual information timed in synchronization with corresponding portions of the computer-generated speech content. Thus, the user may rely primarily on the audio data if desired, while being provided with supporting visual information that can be viewed or interacted with if desired.

In some embodiments of the present disclosure, a service provider system may use data regarding events in different modalities to process spoken commands and other utterances. In some embodiments, the system can use audio data representing an utterance, and also data regarding content visually presented on a display screen of a computing device when the utterance was made. By incorporating data regarding displayed content into the processing of spoken utterances, the system can more accurately determine the meaning of—and more accurately respond to—utterances that reference or relate in some way to the displayed content. Various approaches to context-aware processing of utterances in a multi-modal environment is described in co-owned U.S. patent application Ser. No. 15/828,174, filed Nov. 30, 2017, and entitled "Multi-Modal Natural Language Processing."

FIGS. 1A-1D depict a voice-enabled device 106 presenting a synchronized visual and audio presentation in response to a user's spoken request for item search results, according to one embodiment. In the illustrated embodiment, the voice-enabled device 106 includes a display component, such as a display screen. The voice-enabled device 106 may be in wired or wireless communication (e.g., Bluetooth, ZigBee, etc.) with the display component, and the voice-enabled device 106 may control operations of the display component based on utterances (e.g., spoken user commands or requests) and/or based on touch input in embodiments that include a touchscreen display component. In some embodiments, the display component may be integrated with the voice-enabled device 106 (e.g., the display component may be physically located within the housing of the voice-enabled device, as shown in FIGS. 1A-1D). In other embodiments, the voice-enabled device 106 may be a physically separate device from its associated display component, such as a monitor, television, screen, or other form of visual display. The particular appearance and physical configuration of the voice-enabled device 106 as illustrated is not intended to be limiting. For example, aspects of the present disclosure provide benefits for presenting content on a variety of devices and corresponding displays, and are not limited to, for example, displays having a size and/or shape similar to that illustrated in FIGS. 1A-1D.

As illustrated in FIG. 1A, the voice-enabled device 106 is audibly presenting computer-generated speech content 110 via a speaker component of the voice-enabled device. The speech content 110 audibly informs the user "Here are the top results for your search." While the speech content 110 is audibly presented, the display screen of the voice-enabled device visually presents item images of three items 101A, 102A and 103A matching the user's search request. The user's search request may have been, for example, a speech utterance such as "Show me new clothes available from XYZ Brand." As will be discussed below, the speech utterance may have been sent to a network-based service provider system for processing, and the voice-enabled device 106 may have received responsive presentation information from the service provider system that the voice-enabled device interprets or executes in order to present the audible and visual content illustrated in FIGS. 1A-1D.

Figure 1B:
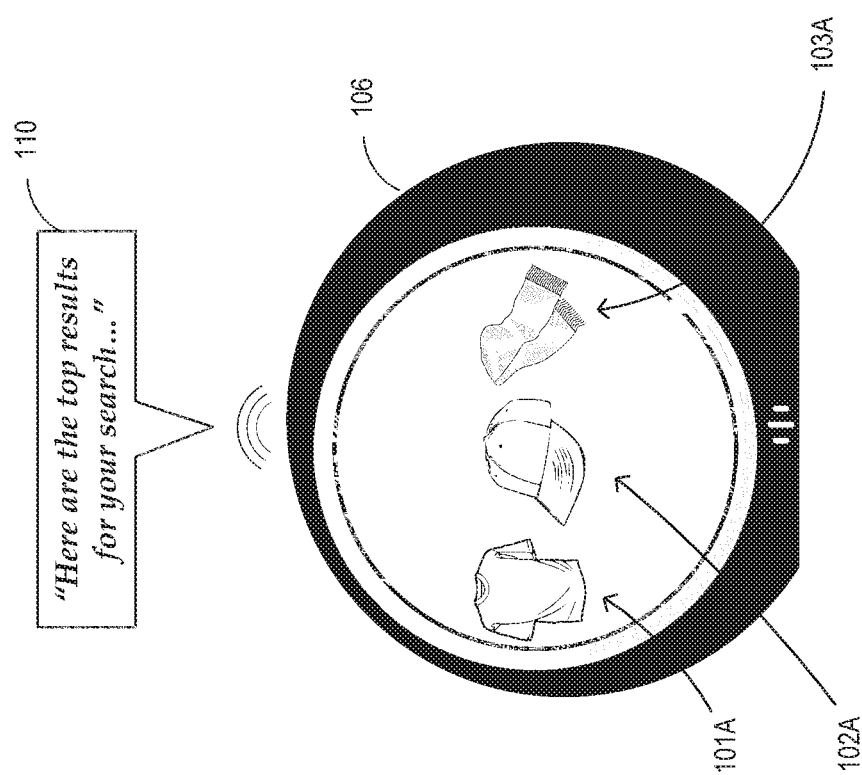

FIG. 1B illustrates a next portion of the synchronized audiovisual presentation of FIG. 1A. As illustrated in FIG. 1B, the voice-enabled device 106 audibly presents computer-generated speech content 120 that presents a first portion of information (in this instance, an item description or title "Classic Shirt by XYZ Brand") regarding the first search result item 101B (previously presented in a smaller form as item 101A in FIG. 1A). Between the visual presentation of FIG. 1A and FIG. 1B, the voice-enabled device 106 may have applied a zoom-in animation effect to gradually bring the image of item 101A to be in a center position on the screen while items 102A and 103A moved off of the screen. In some embodiments, the transition from displaying three search results to focusing on the first result may occur automatically without user intervention or interaction.

Figure 1D:
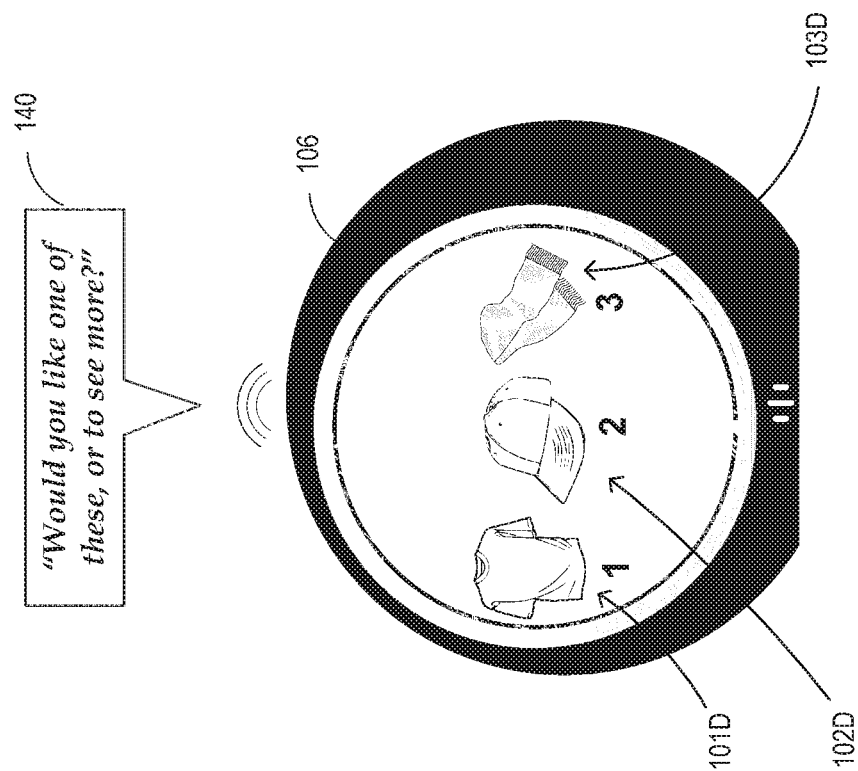
Figure 1C:
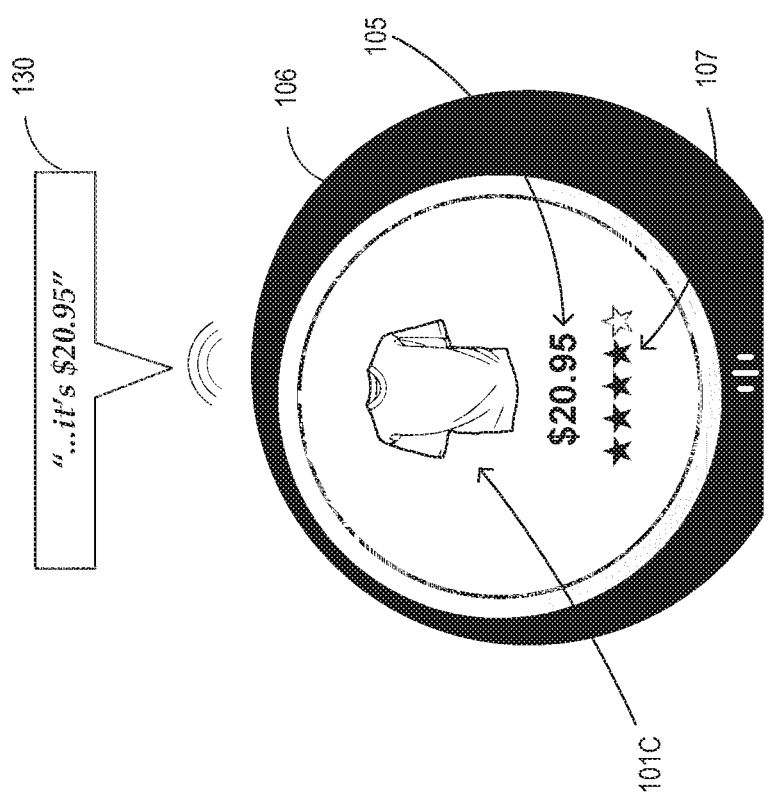

FIG. 1C illustrates a third portion of the synchronized audiovisual presentation that began at FIG. 1A. As illustrated in FIG. 1C, the voice-enabled device 106 audibly presents computer-generated speech content 130 that presents a first attribute (in this instance, the price) associated with the first search result item 101C (previously presented in a different position and size as item 101B in FIG. 1B). As will be discussed below, the specific attributes selected for presentation may depend on various factors, such as the type of item (e.g., author information may be a highly relevant attribute for a book, but not applicable or meaningless for a clothing item), user preferences, screen size, and/or other factors. Between the visual presentation of FIG. 1B and FIG. 1C, the voice-enabled device 106 may have gradually applied a slight zoom-out effect and position shift to gradually move the image of item 101B to be in a higher position on the screen, while the item's price 105 and item rating 107 were added beneath it to the visual display. By keeping the item image 101C (which may serve as an anchor image) displayed while new attribute information is added to the display, the user is kept aware of the current item being discussed in the speech content 130.

In some embodiments, the transition between FIGS. 1B and 1C may occur automatically without user intervention or interaction, such that the computer-generated speech and corresponding synchronized visual content are presented at a typical conversational speaking pace. Accordingly, the user may effectively browse the search results, including learning highlights or summary information regarding the individual results, in a passive manner (e.g., without manually scrolling or selecting displayed options, or verbally requesting information) until he chooses to interact again with the voice-enabled device. In some embodiments, the user may indicate that he is engaged with the visual presentation by, for example, touching a touchscreen display of the voice-enabled device, which may cause additional visual content to appear (such as additional item attributes like an item review or a more detailed item description).

FIG. 1D illustrates a subsequent portion of the synchronized audiovisual presentation after that illustrated in FIG. 1C. As illustrated in FIG. 1D, the voice-enabled device 106 audibly presents computer-generated speech content 140 prompting the user for a response regarding whether he would like to purchase or perform some other action with respect to one of displayed items 101D, 102D or 103D, or would instead like to see and hear about additional search results (such as a fourth, a fifth and a sixth item matching the user's original query or search). Between the visual presentation of FIG. 1C and FIG. 1D, the voice-enabled device 106 may have presented summary or highlight information for each of items 102D and 103D in a similar manner as that shown with respect to item 101C in FIG. 1C (e.g., a zoomed-in image, a price, and star ratings). For example, in one embodiment, the visual portion of the presentation may have included displaying information regarding the first item, then zooming out to show multiple search results (including the first through third items) for the user to be kept aware of the current place in the results, then zooming in to display information regarding the second item, then zooming out to again display multiple search items and keep the user aware of the updated position within the results, then zooming in to display information regarding the third item, etc.

In some embodiments, the presentation may move from item to item automatically without receiving any user input. In other embodiments, user input may be received that either progresses or changes the presentation. For example, an utterance such as "show me the next item" may cause the audiovisual presentation to move to the next item's information, while an utterance such as "show item 5" may cause the presentation to skip one or more items and jump straight to presentation of the item requested by the user.

In some embodiments, the display may zoom out after each individual item's summary display in order for the user to briefly see multiple search result items on the screen before the presentation zooms into (and provides corresponding audio data regarding) the next item in the search results. In this manner, the user may be kept aware of the current place within the search results as individual items are focused on and discussed. As illustrated in FIG. 1D, the display may further include ordinal numbering (in this case "1," "2" and "3") beneath the search result items so that the user has a succinct and clear way to verbally refer to a specific search result item without remembering its title or other information.

Figure 2A:
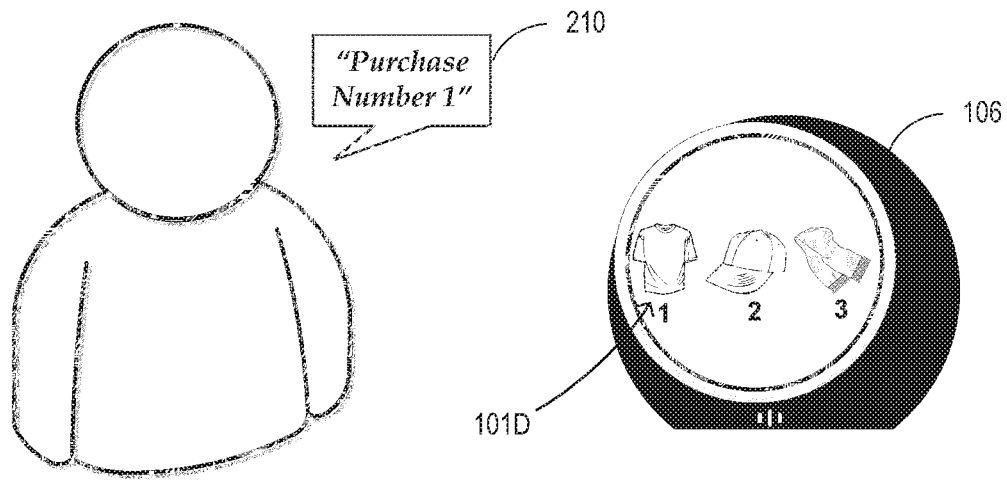
FIGS. 2A and 2B depict the voice-enabled device initiating an item-specific action based on a user's spoken request and context information regarding item search results displayed on the voice-enabled device at the time of the request.

FIG. 2A illustrates a user providing a speech utterance 210 indicating that the user would like to purchase the first item ("Purchase Number 1") in the search results. As shown, the voice-enabled device 106 is currently displaying numbered search results, in which item 101D is labeled onscreen with a "1" beneath it. In other embodiments or instances than that shown in FIG. 2A, contextual information known by the voice-enabled device 106 may provide the voice-enabled device 106 or an associated service provider system with sufficient information to determine which item is being referred to as "Number 1" in utterance 210 even if the item 101D was not displayed on the screen at the time of the utterance (such as if the utterance "Purchase Number 1" were spoken by the user while a different item in the search results was being audibly and visually presented). As another example in a different presentation context, a user may refer to a currently presented item (such as "Purchase this" or "Add two of this to my cart"), and presentation context information described herein may then be used by the service provider system to determine which item was being displayed or discussed at the time of the utterance (e.g., may determine which item the phrase "this" refers to in the user's utterance). As will be discussed below, the speech utterance 210 may be captured by a microphone of the voice-enabled device 106 and either processed locally or sent to a service provider system (along with contextual information, such as information identifying what is currently presented on screen, and/or the ordinal numbering for specific items) for processing and responsive action. While the user utters a command to purchase an item in FIG. 2A, the voice-enabled device 106 may be configured to process requests for many other types of actions with respect to an item, such as adding the item to a shopping cart, providing additional item details, providing estimated delivery date or shipping information for a previously purchased item, etc.

Figure 2B:
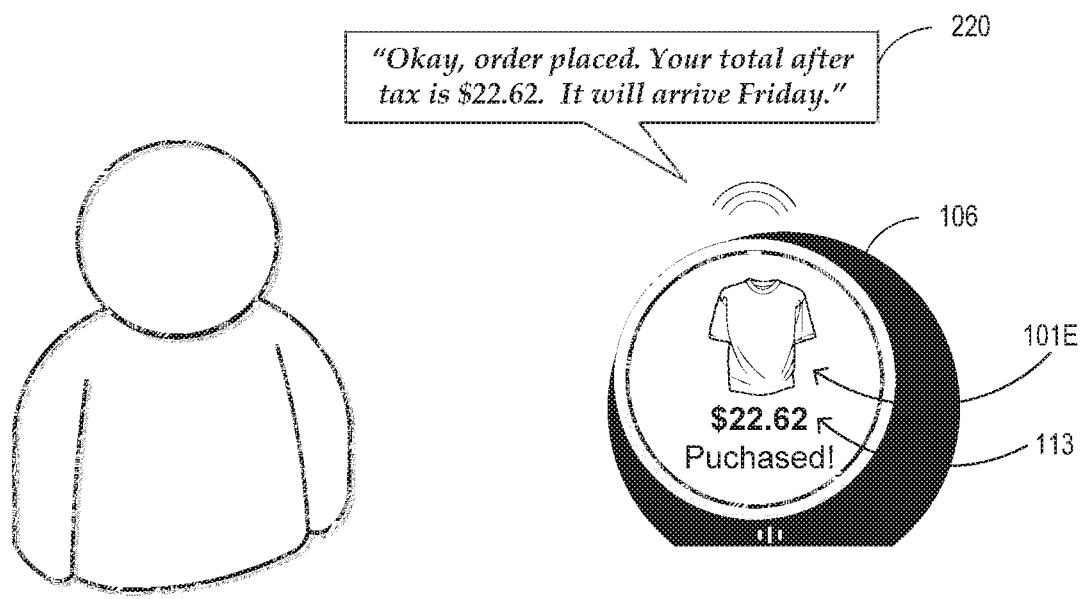

FIG. 2B depicts the voice-enabled device 106 initiating an item-specific action based on a user's spoken request and context information regarding item search results displayed on the voice-enabled device at the time of the request. The scene depicted in FIG. 2B may occur, for example, within a few seconds after FIG. 2A described above. Between FIGS. 2A and 2B, the voice-enabled device 106 may have sent the user's purchase request to a network-based service or server, and then received back confirmation that the purchase or other requested action was completed (including, in some embodiments, the visual and audio content to present to the user regarding the purchase or other action). As illustrated, the voice-enabled device 106 presents audible speech content 220 confirming that the order was placed and providing the user with final pricing and delivery information. The voice-enabled device 106 further presents related information regarding the order visually in the form of an item image 101E and final price 113.

While FIGS. 1A-1D and 2A-2B have been described with reference to a user request to search items in an electronic catalog and to subsequently request to purchase one of the items, this example is provided for illustrative purposes only. Aspects of the present disclosure have utility in a variety or search settings (retail and otherwise) as well as in settings other than a search. For example, audiovisual presentations as described herein may be used to respond to any of a number of types of user requests that result in lists of items or pieces of data. Some examples include user requests for order status or delivery status of existing orders or purchases, listing of items in an electronic shopping cart, upcoming movie show times, news articles, listings of available local businesses or services, searches for image, emails or other files accessible to a user, and many others, according to some embodiments.

Figure 3:
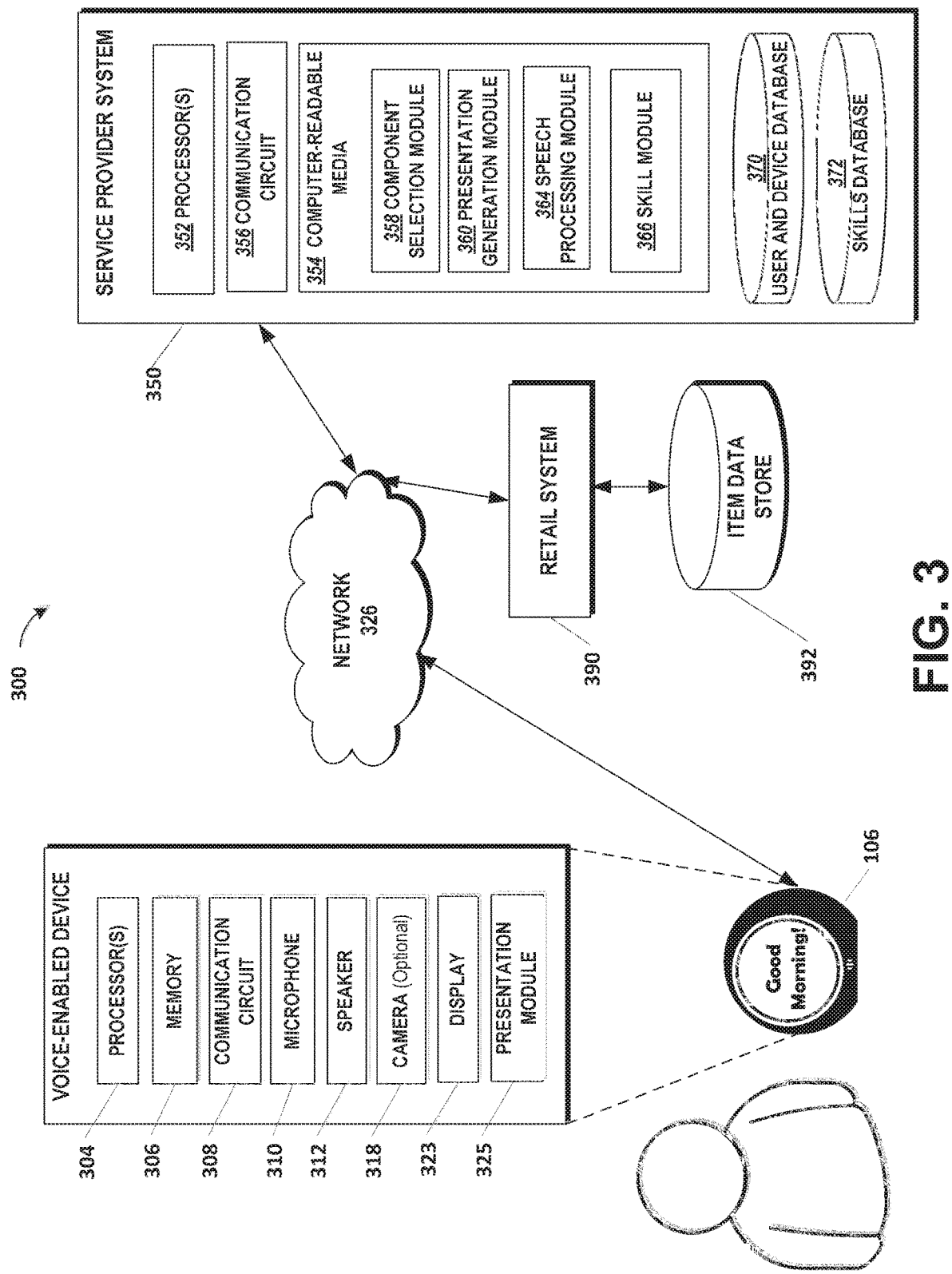
FIG. 3 illustrates an example networked environment and system architecture of a voice enabled device and service provider system, according to some embodiments.

FIG. 3 illustrates an example networked environment 300 in which a voice-enabled device 106 may communicate with a service provider system 350, according to some embodiments. Voice-enabled devices such as device 106 may provide a user with a wide variety of services including weather, remote controlling of music or movie applications, calling features, purchasing or browsing of items (such as products and services), and/or other features depending on the location and context. Generally, each of these devices may be controlled by a user through the device's recognition of voice commands spoken by the user. The devices receive commands and may parse the commands internally or transfer the commands to an external computing system, such as the service provider system 350 or other network-based system or service, for processing. While an external processing system other than the service provider system 350 (such as a server or service that processes and responds to voice commands from a number of different voice-enabled devices over the network 326) is not illustrated in FIG. 3, the service provider system 350 may be part of or otherwise associated with such a system or may provide such functionality itself.

Voice-enabled devices are expanding their numbers and reach. The devices may be located in various places, including at a user's home, integrated within a mobile phone or tablet device, in a car, at an office, in a hotel room, integrated in a wearable device such as a smart watch, and/or other locations. Other suitable devices for implementing aspects of the present disclosure may include desktop and laptop computing devices, smartphones, tablets, voice-capturing devices such as smart speakers, smart appliances, and/or other "Internet of Things" (IoT) devices. Functionalities or skills may be offered to devices by a cloud-based service provider environment to implement particular tasks requested by the devices. A device may be associated with a user's account and/or a device-specific account in the service provider environment, which may be maintained by the service provider system 350. The general architecture of a voice-enabled device and the service provider system may include an arrangement of computer hardware and software modules used to implement aspects of the present disclosure. Both types of systems may include many more (or fewer) elements than those shown in FIG. 3.

Skills or functionalities that are responsive to voice input from voice-enabled devices may be referred to as voice-enabled skills or voice-enabled functionalities. In various embodiments, the voice-based skills provided by the service provider environment may include, for example, searching a catalog of items, requesting the status of orders, purchasing an item, adding an item to an electronic shopping cart or other list, and/or many others.

In some embodiments, individual skills or functionalities may be associated in the service provider system with an "intent" that may represent an action that fulfills a user's spoken request, and may have an associated code module to be executed by the service provider system. Intents can optionally have arguments, which may be referred to as "slots" in some embodiments. For example, a skill for planning a trip might define an intent named PlanMyTrip that has slots named fromCity, toCity, and travelDate. A user can then speak a command such as "Ask the Plan My Trip service to plan a trip from Seattle to Portland on Friday." Once the request is received and parsed, the service provider system 350 may then call a code module or service associated with the PlanMyTrip intent with the value "Seattle" in the fromCity slot, "Portland" in the toCity slot and the date for the next upcoming Friday in the travelDate slot. The service provider system can then save this information and provide responsive text to convert to speech for audible presentation to the user.

Voice-enabled functionality described herein may be associated with dedicated hardware (such as illustrated with standalone voice-enabled device 106), or may be implemented within a software application sharing processing power and storage with other applications in a computing system. A mobile phone or tablet device, for instance, may operate a voice-based application, or such functionality may be provided by or integrated with an operating system of a computing device, such as a mobile phone.

The service provider system 350 may include one or more processors 352 and computer-readable media 354. The service provider system 350 may also include one or more internal or external databases containing data about various voice-enabled devices and user profiles or accounts (such as user and device database 370). As one may readily appreciate, devices and users identified in the database 370 may be associated to indicate that a certain user owns or, alternatively, has access to a particular voice-enabled device. The association may be one-to-none, one-to-one, one-to-many, or many-to-many. Such associations may be permanent or temporary. For instance, a voice-enabled device in a hotel room may no longer be associated with a particular hotel guest once the guest checks out of the hotel. The user association with a given voice-enabled device may be used, for instance, for the service provider system to apply user preferences associated with the user's account during the voice-based interactions with the user. The skills database 372 may store, for each of a number of skills or functionalities, identification of intents, code modules, sample utterances, and invoking phrases.

The computer-readable media 354 (which may be referred to as memory) may include various software or hardware modules that perform various methods described herein, such as when executed by the processor 352. The memory may include RAM, ROM and/or other persistent, auxiliary or non-transitory computer-readable media. In the illustrated embodiment, the modules include component selection module 358, presentation generation module 360, speech processing module 364, and skill module 366. The component selection module 358 may generally select which items and/or item attributes of those items should be included in an audiovisual presentation. The presentation generation module 360 may generate audio presentation information and associated supporting files to be sent to a voice-enabled device for synchronized audiovisual presentation. The skill module 366 may implement various skills or functionalities, such as in response to an associated invoking phrase or command detected in recorded audio data (such as by the speech processing module 364). The speech processing module 364 may analyze received audio signals to extract content and context of user speech utterances.

In some embodiments, some or all of the modules may have their own dedicated hardware (including their own memory) and interface with the service provider system 350 over a network 326 rather than residing in the service provider system 350. In some embodiments, other modules may be implemented as services. Services in the environment 300 may be implemented according to a service-oriented architecture (SOA) in which services exchange requests and responses to perform complex operations. For example, the speech processing module 364 may be implemented as a service that analyzes and acts upon voice input from a voice-enabled device and returns content and metadata for the analyzed voice input. In some embodiments, the speech processing module 364 may use various algorithms to identify the originating source of an audio signal, which may be a particular user. For example, the speech processing module 364 may use pattern recognition, machine learning models, and/or various voice profiling techniques to identify a specific user's voice and tag the audio signal with a speaker identifier for that user.

In some embodiments, the service provider system 350 may include a communication circuit 356 for connecting to the network 326. The communication circuit 356 may provide connectivity to one or more networks or computing systems, such as voice-enabled device 106 and retail system 390. The processor 352 may receive information and instructions from other computing systems or services via one or more networks.

The service provider system 350 may be in network communication with one or more servers or other systems that provide access to items, such as retail system 390. The retail system 390 may be connected to, or in communication with, an item data store 392 that stores item information regarding a number of items, such as items listed in an electronic catalog as available for browse and/or purchase via the retail system or service. In other embodiments, the service provider system may directly access the item data store 392. Item data stored in item data store 392 may include any information related to each item. For example, item data may include, but is not limited to, price, availability, title, item identifier, item feedback (e.g., user reviews, ratings, etc.), item image, item description, item attributes, keywords associated with the item, etc. In some embodiments, the item data store 392 may store digital content items (e.g., audiobooks, electronic books, music, movies, etc.). In some embodiments, the retail system 390 may also be connected to, or in communication with, a user data store (not illustrated) that stores user data associated with users of the retail service, such as purchase history, browsing history, item reviews and ratings, personal information, user preferences, location information, activity information, etc.

Item attributes stored in item data store 392 may include, for example, price, size, color, manufacturer, weight, and/or many others, as discussed elsewhere herein. It will be appreciated that some item attributes may be specific to a given item type. Item attributes for a book, for example, may include book title, author, publisher and page count, while item attributes for an item of clothing may include size, color, designer, gender, etc. Stored item attribute data, in some embodiments, may include both item attribute types and associated item attribute values for a specific item. Example item attribute types for a given item, such as a running shoe, may include "Title," "Color," "Size," "Fabric Type," "Brand Name," "Sole Type," etc. An item attribute value may be a value associated with a given item attribute type. For example, the "Fabric Type" item attribute type for a given item, such as running shoes, may have an associated item attribute value of "leather." The term "attribute" as used herein may broadly refer to a single piece of data regarding an item, such as its title or its description, may refer to the combination of an attribute type and its associated value, or may refer to only the attribute value (e.g., "$9.99," rather than "price: $9.99") depending on the context. For example, "size: small" may generally be considered an attribute for an item, but may be stored as an object having the attribute type "size" and the value "small."

As further illustrated in FIG. 3, the voice-enabled device 106 may include a processor 304, a memory 306 (e.g., a computer-readable medium), a communication circuit 308, a microphone 310, a speaker 312, a device database 324, an optional camera 318, a display 323 and a presentation module 325. In some embodiments, the display 323 may be a touchscreen display. The memory 306 may contain computer program instructions (grouped as modules or modules in some embodiments) that the processor 304 may execute in order to implement one or more embodiments described herein. More specifically, the memory 306 may store an operating system and may further include computer program instructions and other information for implementing aspects of the present disclosure. The presentation module 325 may be responsible for interpreting data received from the service provider system 350 and generating synchronized audiovisual presentations for display on the display 323 and audible presentation by the speaker 312.

The microphone 310 detects and records audio signals. Verbal audio signals (such as spoken utterances by a user) may contain content that can be analyzed and extracted by the speech processing module 364 for their content and/or to determine a human speaker's identity. In some embodiments, a speech processing module similar to module 364 may be included in the voice-enabled device 106 for local processing of recorded audio data (not illustrated). The speaker 312 may be used to play audio data received from the service provider system 350 to the user, or to play locally-generated audio data (such as using text-to-speech functionality).

Figure 4:
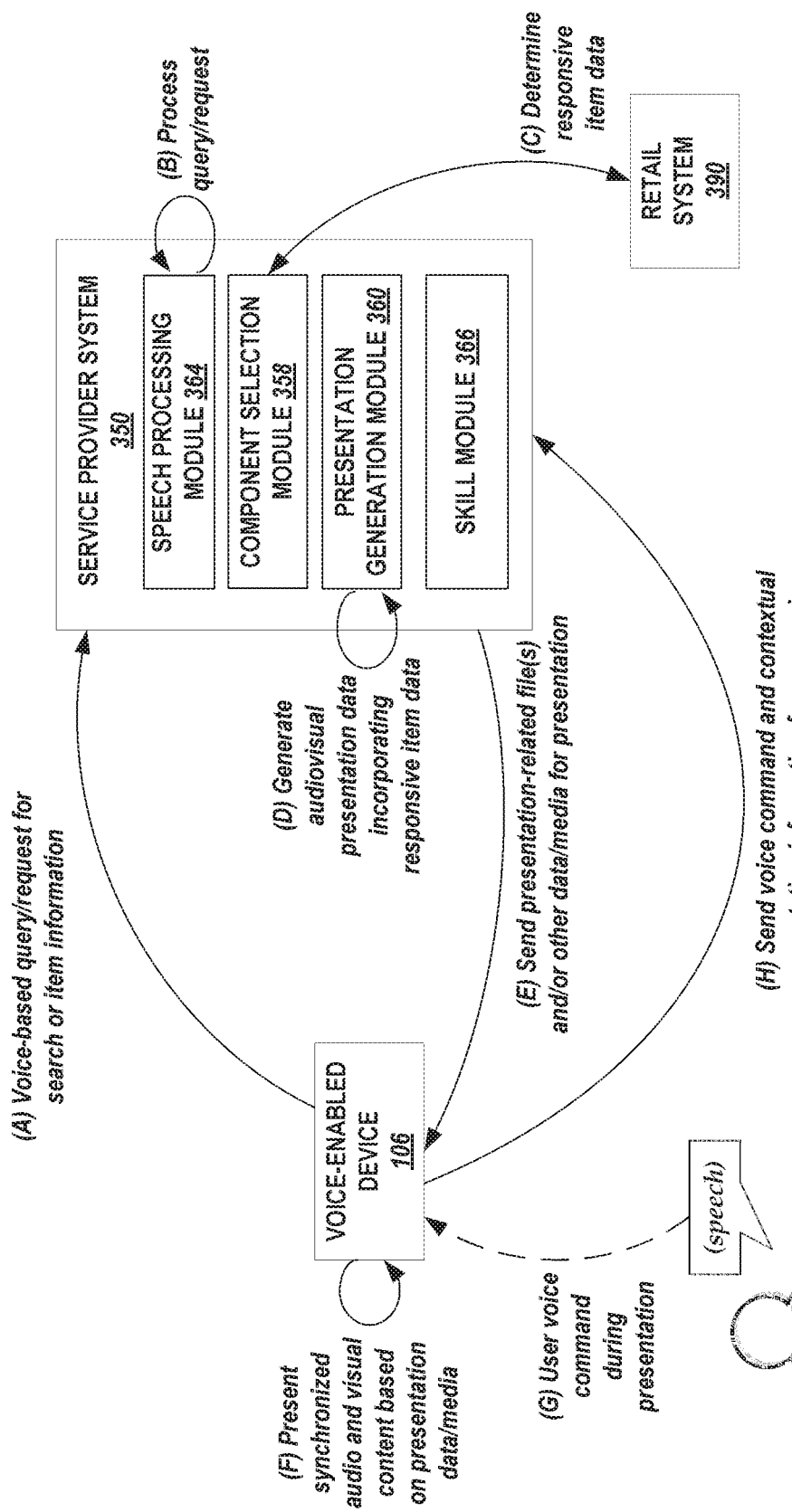
FIG. 4 is a block diagram depicting an illustrative generation and flow of data within the networked environment of FIG. 3, according to some embodiments.

FIG. 4 is a block diagram depicting an illustrative generation and flow of data within the networked environment of FIG. 3, according to some embodiments. The illustrative flow begins with (A) the voice-enabled device 106 sending a voice-based search query or request for item information to the service provider system 350 over a network, such as the Internet. The voice-based request may be sent as audio data (e.g., recorded audio data of a speech utterance by a user that was captured by a microphone of the voice-enabled device 106). In another embodiment, the voice-enabled device 106 may process a speech utterance before sending the request in another form. The request may include, for example, a request to search items available from a retail service for items matching one or more keywords or criteria spoken by the user (e.g., "search for digital cameras under $400"). As another example, the request may be a query related to a user's account or previous activity (e.g., "when are my orders being delivered?"). In some embodiments, the request may be entered by the user as text data or by making selections in a user interface rather than by voice.

Once the service provider system 350 receives the request, the service provider system's speech processing module 364 may (B) process audio data in the request to determine the words spoken by the user. For example, the speech processing module may employ various known techniques, such as speech-to-text techniques, natural language processing and others to determine words spoken by the user. In some instances, the speech processing module may provide the words as input to the skill module 366 to identify, for example, a skill invoked by an invoking phrase identified in the recorded utterance received from the voice-enabled device. For example, one skill or functionality may be an item search skill (invoked by a phrase such as "find items" or "search for," followed by criteria), while another skill or functionality may be a shipping tracker skill (invoked by a phrase such as "where's my package").

Next, the component selection module 358 of the service provider system 350 may (C) communicate with the retail system 390 to identify responsive item data for the user's request. For example, if the user's request was a search request for items matching keywords provided by the user, the retail system and/or component selection module may identify items in item data store 392 matching the searched keywords. The component selection module may further determine which specific item attributes and media assets (e.g., images or video) associated with each of the matching items in the item data store should be included in responsive search results that will be sent back to the voice-enabled device for presentation. The media assets may be selected, in one embodiment, such that each item has a representative image of the item that will be included in the search results. The representative image for each image may have been previously tagged in the item data store as the primary image for the item, or may be dynamically determined based on popularity, quality, or other data.

In some embodiments, the specific attributes or attribute types may be selected based on user preferences of the user that submitted the request. For example, one user may have indicated that he wants to be presented with price per unit information, while another user may only be interested in total price. The specific attributes may additionally or alternatively be selected based on an item type of individual items in the search results. For example, a brand name attribute may be selected for designer clothing items because this may be considered important information to users shopping for this type of item, but brand name may not be a selected attribute for household items such as a light bulb or paper towels. In some embodiments, individual items may each be associated with dozens of attributes in the item data store 392, but only a small subset of the attributes may be selected by the component selection module 358 for inclusion in the presentation data. Both the items selected to include in the presentation and the specific attributes of each item to include may be further customized for the individual user in various ways. For example, other than user preferences discussed above, the results may be based on user purchase history or browsing history, may incorporate recommended items for the user determined by the retail system, may be varied between different users for testing purposes, and/or may be modified for the specific user in other manners.

Once the items and their attributes and media assets have been selected, the presentation generation module 360 may (D) generate audiovisual presentation data incorporating the item attribute information selected above for the item search results. In some embodiments, the audiovisual presentation data may include a computer-generated audio file of speech content generated from the item attribute information, including markup information identifying content to be visually presented at various points in the audio presentation. The generated content may also include one or more supporting data files that include, for example, data objects representing the various item attributes of each item in the item search result, where such objects may be referenced by the markup data in the audio file. Generating these presentation files will be discussed in more detail below with reference to FIG. 5.

Once the presentation data and associated file(s) are generated, the service provider system 350 (E) sends the presentation data and associated file(s) to the voice enabled device 106 for audiovisual presentation. In some embodiments, the files or data sent to the voice-enabled device may be sent in phases. For example, the service provider system may initially send a text-based file, such as an Extensible Markup Language (XML) document or JavaScript Object Notation (JSON) file that includes item attribute information of the items in the search results, and that also identifies uniform resource identifiers (URIs) for various media content (such as the audio file generated to described the search results, as well as image or videos of individual items in the results). The voice-enabled device may then parse the initial file to determine which additional URIs to request over the network either before beginning the audiovisual presentation of the search results, or as individual media assets are needed during the presentation.

The voice-enabled device 106 may (F) present a synchronized audio and visual presentation based on the received presentation data and associated files received from the service provider system. The presentation may be, as one example, similar to that described above with reference to FIGS. 1A-1D. The voice-enabled device may play the item search result audio data received from the service provider system 350, or in other embodiments may generate speech content itself from a transcript received from the service provider system or based on the attribute information received from the service provider system. As markup information is encountered in the audio data file or in a supporting data file, the voice-enabled device 106 may retrieve a corresponding item attribute or media asset and visually present it in synchronization with audible presentation of a corresponding portion of the audio data. Methods for presenting the audiovisual presentation based on data received from the service provider system will be discussed in more detail below with reference to FIG. 6.

During the presentation, the voice-enabled device 106 may (G) capture a user voice command or other utterance. The voice command may be related to navigation within the presentation (e.g., "show the next item," "show item three," or "what's the price?"), or may a request to take some action with respect to an item (e.g., "add that to my wish list," or "purchase item three"). In some embodiments, navigation commands may be processed locally by the voice-enabled device 106 without a network request. For example, a request to sort item results in a different manner (e.g., an utterance such as "Show me the cheapest items" or "Which one is the best deal?") may not require additional information from the service provider system 350, but could instead be processed by the voice-enabled device 106 and the presentation updated accordingly based on the items' attribute information already received from the service provider system. In embodiments in which the voice-enabled device relies on the service provider system 350 for speech processing, or in instances where the command relates to an action to be performed on another system or server (e.g., a request for a purchase action to be initiated at the retail system 390), the voice-enabled device 106 may (H) send the command and contextual information to the service provider system 350 for processing.

The contextual information may indicate, for example, a point in the presentation at which the voice command was received (e.g., an indication of what was displayed at the time) and globally unique identifiers of items having ordinal numbering in the presentation (e.g., the contextual information may indicate that "item #3" in the presentation is actually an item having a given unique identifier in the item data store 392). Contextual presentation data and its use in responding to spoken requests is discussed in more detail in co-pending, co-owned U.S. patent application Ser. No. 15/828,174, referenced above.

Figure 5:
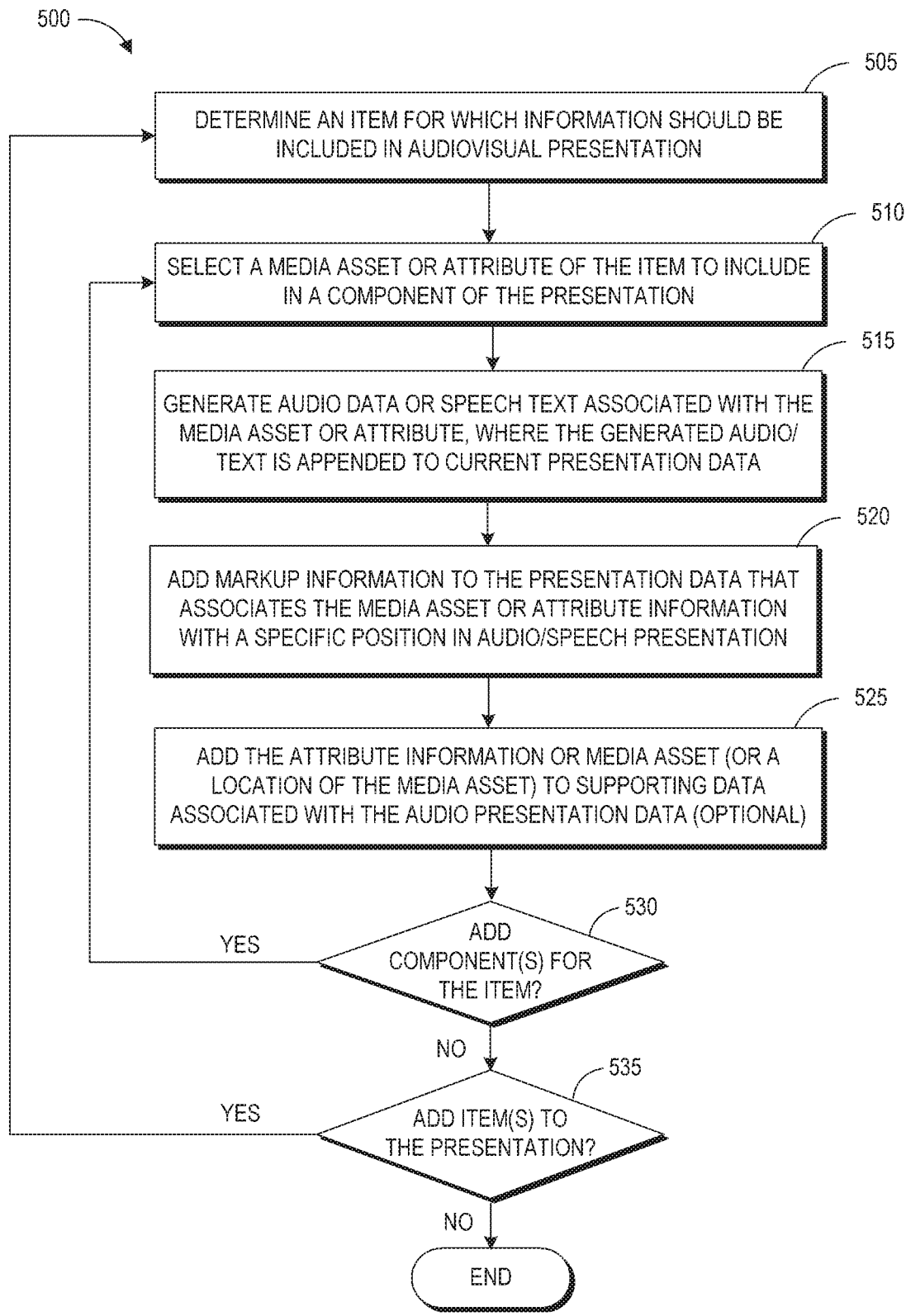
FIG. 5 is a flow diagram of an illustrative method for generating an audio presentation file providing summary information for one or more items, where the presentation file includes markup information identifying visual content to be presented in synchronization with the audio data.

FIG. 5 is a flow diagram of an illustrative method 500 for generating an audio presentation file providing summary information for one or more items, where the presentation file includes markup information identifying visual content to be presented in synchronization with the audio data. The method 500 may be performed by the service provider system 350, in some embodiments, to generate a presentation file with markup information to be sent to a client computing device for presentation. While illustrative method 500 will be described below with reference to embodiments in which the presentation data is generated as a file and the supporting data may be formatted as a file, it will be appreciated that the presentation data and supporting data may each be generated and sent to a client device in many forms (e.g., various data packages, streams of data packets, etc.) that may not necessarily be considered to be a file.

The illustrative method 500 begins at block 505, where the service provider system 350 may determine a first item for which information should be included in the audiovisual presentation. As discussed above, the item selection may be based on a specific query from a user, such as a search request or a request for item information regarding one or more specific items. For this first item, the method then proceeds to block 510, where the service provider system 350 may select a first media asset or first attribute of the item to include in a first component or portion of the presentation. As discussed above with respect to FIG. 4, the attributes to include for a given item may be based on an item type of the item, a user preference, and/or based on other information (such as historic browsing patterns or item interaction data indicating attributes of the most interest to users). The first attribute may generally be selected to be of likely interest or importance to a user and/or to be highly descriptive of the item. As one example, the first attribute may be a title or description of the first item. In other embodiments, a media asset (such as a photo or other image of the first item) may be selected at block 510 rather than a text-based attribute.

Next, at block 515, the service provider system 350 may generate audio data and/or speech transcript text associated with the media asset or attribute selected above. For example, the presentation generation module 360 may be configured to generate narrative text based on attribute data using a template, a rule set or other stored logic. For example, if the first attribute for the item is of the attribute type "weight" and has a corresponding attribute value of "12 lbs," the presentation generation module may automatically generate transcript text such as "it weighs 12 pounds." In some embodiments, the presentation generation module may generate audio data that includes computer-generated speech content speaking the transcript text. In other embodiments, the presentation file may be generated to include the transcript text as text data to be converted to computer-generated speech at the client computing device (such as voice-enabled device 106).

As illustrated and will be described further below, the illustrative method 500 includes potentially multiple passes or loops through block 515. In the first pass, the presentation generation module may begin a new presentation file starting with the first item's attribute information, or may append the first item's attribute information as audio data to an audio file that already includes an overview of the search results or other item listing (e.g., includes spoken words such as "There are 25 matches for your search, the first match is . . . "). In successive passes through block 515 for additional item attributes of the first item or item attributes of an additional item, the presentation generation module may continue to append each newly generated transcript portion or audio data portion to the presentation file. In some embodiments, the audio data for each of a number of item search results may be appended to each other or otherwise combined to create a single audio file (such as a single MP3 formatted file) that includes audio data regarding multiple item results. In other embodiments individual audio files may be separately stored for individual items, and the order of playback for the various audio files (along with metadata such as the item that the file relates to) may be indicated in a supporting file (such as an XML or JSON file) for the presentation.

At block 520, the presentation generation module 360 of the service provider system may add markup information to the presentation file that associates the media asset or attribute information (selected at block 510) with a time-stamped position or other specific position in audio (or a transcript to be converted to audio) of the presentation file. For example, markup information may be added that indicates a point in the audio at which the corresponding attribute or media asset should be displayed or visually presented. In some embodiments, the markup information may include both a time or point in the audio or transcript at which the attribute or media asset should first be shown, as well as a time or point in the audio or transcript at which the attribute or media asset should be removed from view or otherwise no longer presented. Depending on the embodiment, the markup information may be added within the same file as the audio presentation data as a tag or marker at a given point in the audio, or may be included in a separate file that references a point in the audio data by byte offset or timestamp.

The format of the markup information may vary depending on the embodiment. In one example, a reference to a given attribute in the markup information may refer to a label or name of a data object in a supporting file (such as a JSON file or similar, discussed below). For example, the label may indicate a short item identifier of the current item (such as an ordinal number within the search results, like "1" or "2") and a name of the given attribute (such as "color"). In other embodiments, the markup information may be more descriptive, such as providing the attribute information itself (e.g., "color: blue"). In yet other embodiments, the attributes included in the presentation file may each be given a unique identifier for purposes of the given presentation file, such that they can be referenced by that identifier (e.g., the markup information may simply refer to attribute or object "23," where attribute 23 may be indicated in supporting data as "color: blue" and be associated with a specific item).

Either after, before or in parallel with the addition of markup information at block 520 above, the presentation generation module 360 may add the given attribute information or media asset (or a reference to the media asset, such as a URI location from which the media asset can be retrieved) to a supporting data file associated with the audio presentation file. In some embodiments, as mentioned above, the supporting data file may be a text-based file, such as a file in a JSON or XML format, that includes item attribute information of the items in the search results, and that also identifies URIs for the various media content (which may include the audio file generated to described the items, as well as image or videos of individual items in the results). In some embodiments, the references to media content in the supporting data may be network-based URIs that indicate to the recipient client device to request the media content over a network. In other embodiments, the references may be to a file name or object name in a data package assembled by the presentation generation module 360 and sent to the client computing device, such that the client computing device does not need to request additional content over a network once receiving the presentation file and supporting data file(s).

At decision block 530, the presentation generation module 360 and/or component selection module 358 may determine whether to add additional attributes, media assets or other components to the current item's portion of the presentation. If the determination is that there is at least one more component to add, the method loops back to block 510 to begin the process of adding the next attribute or media asset for the current item. If the determination is that no more components are to be added to the presentation for the current item, the method proceeds to block 535, discussed below.

In some embodiments, the method may continue looping through blocks 510, 515, 520, 525 and 530 to create a summary of the current item that presents basic information of the item and/or highlights particular characteristics of the item that may be of interest to a user. For example, the first few passes through the loop may select a representative media asset (such as a photo or image of the item) and basic attribute information of the item (such as name or title, an author of a book, a price, etc.), while successive passes may include more detailed information such as a review of the item, an instructional video, and/or many others. In some embodiments, some attributes may be included in the presentation, but with indicated conditions regarding when they should be presented, if at all. For example, an item review may be included in the presentation file, but may only be presented to the user in response to a user request (received during the presentation) for additional information regarding the given item. As another example, attribute information regarding the number of units included in an item may be incorporated into the presentation information generated by the service provider system, but may only be presented to the user in response to a request or question related to that attribute (such as a user speaking the question "How many razors are in this pack?" during a portion of the presentation regarding a pack of razorblades).

At decision block 535, the presentation generation module 360 and/or component selection module 358 may determine whether there are additional items to add to the presentation. If so, the method may loop back to block 505 to begin the process discussed above of generating the presentation data for the next item. If there are instead no additional items to add to the presentation the illustrative method ends. As an example, in one embodiment, if an item search was performed and located 20 search results, the "yes" path of block 535 may be followed 19 times (once for each item after the first item). In another embodiment, the presentation generation module 360 and/or component selection module 358 may be configured to limit the number of items in the presentation file to a threshold or capped amount (such as 5, 10 or 15 items) in order to limit the size of the presentation file and supporting data that will be sent over a network. In such an embodiment, the service provider system may store information regarding the additional item results, such that a subsequent presentation file can be generated in the future if the user requests to see additional item results beyond the initial threshold amount.

While FIG. 5 has been described above with respect to embodiments in which the service provider system 350 performs each of the illustrated blocks, a voice-enabled client device may perform at least some of the blocks of FIG. 5 in other embodiments. For example, in one embodiment, the service provider system may send to a client computing device (such as voice-enabled device 106) search results as text data or other raw data (e.g., not formatted as a presentation), and the client computing device may generate the presentation data dynamically before or during its audible and visual output of the presentation. For example, the client computing device may be configured to generate a speech transcript based on the attribute information for each item, convert the speech transcript into computer-generated audible speech content, determine the timing of visual display based on a template or other file, etc.

Figure 6:
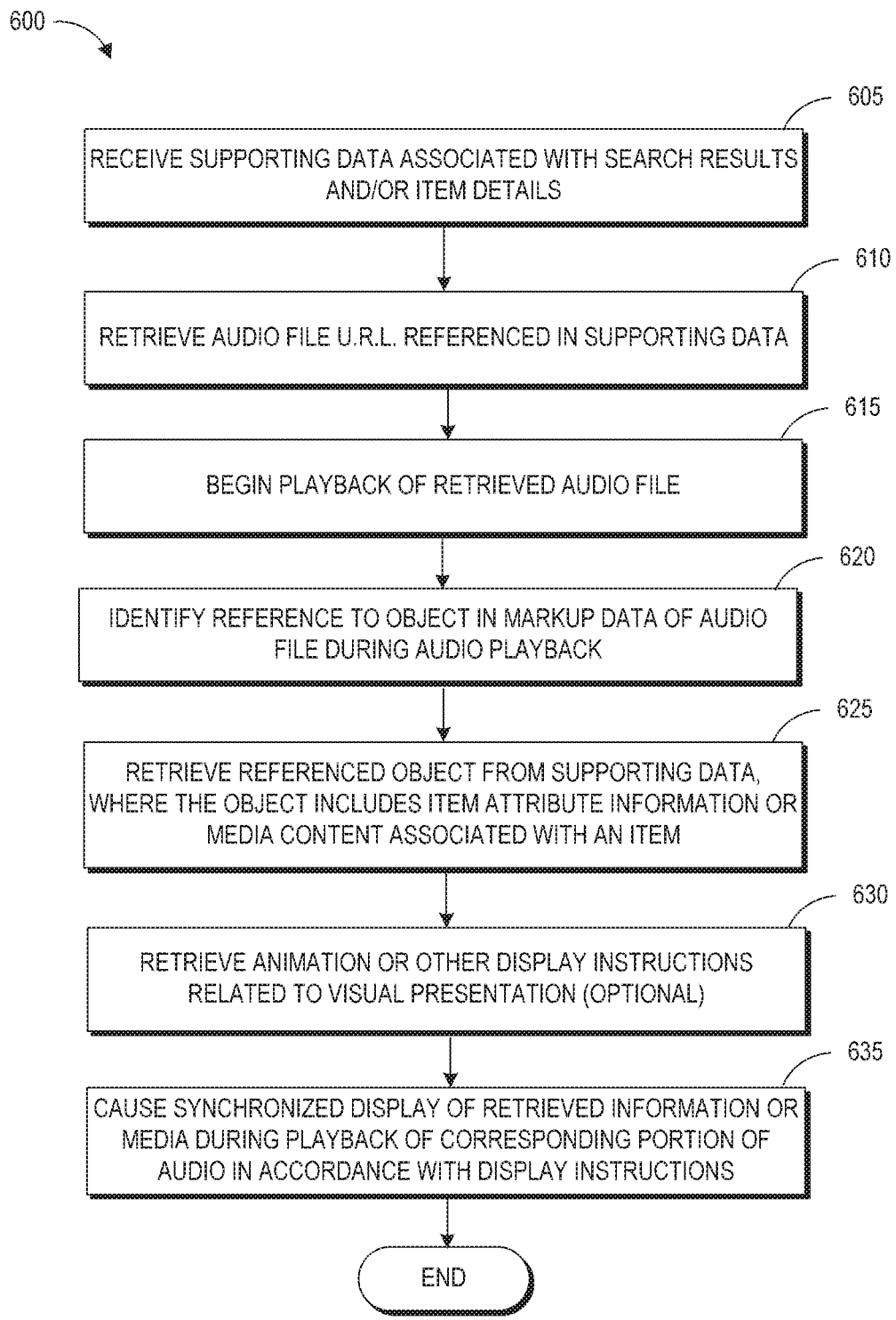
FIG. 6 is a flow diagram of an illustrative method for causing synchronous display of visual content during playback of audio data regarding one or more items.

FIG. 6 is a flow diagram of an illustrative method 600 for causing synchronous display of visual content during playback of audio data regarding one or more items. The illustrative method 600 may be performed by a client computing device, such as voice-enabled device 106. The illustrative method will be described below with respect to an embodiment in which the audiovisual presentation is presented based on a presentation file and corresponding supporting data received from the service provider system. In other embodiments, as noted above, a client computing device may dynamically generate a similar interactive audiovisual presentation without receiving a pre-generated presentation file from another system.

Illustrative method 600 begins at block 605, where the voice-enabled device 106 receives the supporting data file associated with the search results and/or other item set to be presented to a user. As discussed above, the supporting data file may be a JSON file in some embodiments, which is suitable for transmitting the various item attributes as data objects that include item attribute type and value. The voice-enabled device 106 may then identify a URI reference within the supporting data to the corresponding audio speech file (or a transcript of the speech to be presented) for the presentation, and may retrieve the audio file by requesting data associated with this URI or uniform resource locator (URL) over a network at block 610. In other embodiments, as noted above, the audio file may be sent with the supporting data originally, without the need for the voice-enabled device 106 to parse an initial file or dataset to determine a URI of the audio or transcript data.

At block 615, the voice-enabled device 106 may initiate playback or audible presentation of the presentation audio file. This may include, in one embodiment, playing an MP3 or other audio file received from the service provider system. In another embodiment, this may include audibly presenting computer-generated speech content derived from a text transcript received from the service provider system. Prior to or during the initial presentation of the audio data, the voice-enabled device 106 may identify a reference to an object (such as an item attribute or image) within markup data of the presentation file at block 620. The voice-enabled device 106 may then, at block 625, automatically retrieve that referenced object from the supporting data file based on its object or attribute identifier discussed above. As will be appreciated, the voice-enabled device 106 may look ahead within the presentation data such that there is sufficient time to, for example, retrieve relevant objects referenced within the upcoming portions of audio data and store them in RAM or otherwise prepare them for display prior to the audio playback reaching the marked location for display. In instances where the object is a text-based attribute, the voice-enabled device 106 may generate visual image data, in some embodiments, that presents the text attribute in a visually pleasing manner, such as using a font and color previously selected by a user or identified in a display template.

At block 630, the voice-enabled device 106 may optionally retrieve or determine an animation or other display alteration or effect related to the visual presentation of one or more of the attributes or media assets. In some embodiments, a display effect or display alteration, such as a zoom-in action, zoom-out action, sliding or shaking movement, rotation, fade-in or fade-out, and/or other effect may be applied to a specific object (e.g. displayed attribute or image) or to the displayed content as a whole. These display instructions may be previously stored at the voice-enabled device 106 as a template or as computer-executable instructions (such as in a scripting language), and may be reused across a variety of presentations. For example, the template may indicate a series of animations or visual effects to applied for each item in the item results (e.g., display the first object at a certain screen location and size, move that object over a 2 second timeframe to a different position once the second object is to be presented, add the second object at a predefined location beneath the first object, etc.). In some embodiments, the template or display instructions may be sent by the service provider system for the specific presentation.

Lastly, at block 635, the voice-enabled device 106 causes synchronized display of the retrieved object (e.g., an attribute value or media asset associated with an item) during audible presentation of the corresponding portion of audio (e.g., as indicated in the markup information of the presentation file) in accordance with any display instructions to be applied. Such display has been described above with respect to specific examples. As will be appreciated, additional objects may subsequently be displayed as the presentation progresses (such as by repeating blocks 620, 625, 630 and 635) and additional objects are referenced in the markup information. The method may end once the end of the presentation is reached, or in response to a user interruption of the presentation (such as in response to a speech utterance from the user).

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
  computer-readable memory storing executable instructions; and
  one or more hardware processors in communication with the computer-readable memory and configured by the executable instructions to at least:
  send, to a computing device over a network, an item search request received from a user, wherein the search request is received as a spoken utterance by the user;
  receive, from the computing device over the network, supporting data associated with item search results for the item search request, wherein the supporting data includes ordinal numbering of individual items in the item search results, the ordinal numbering defining presentation order comprising at least a first item followed by a second item;
  receive an audio file that includes speech content regarding at least an initial subset of the item search results;
  identify, in the audio file, first markup information that includes a reference to a first object to be visually presented during playback of first speech content in the audio file, wherein the first speech content describes the first item in the item search results;
  based on the first markup information, retrieve the first object from the supporting data, wherein the first object comprises an attribute or image associated with the first item;
  cause synchronous audible presentation of the first speech content and visual presentation that includes the first object;
  during audible presentation of second speech content associated with the first item, cause a first updated visual presentation that includes a second object associated with the first item, such that the first object and second object are simultaneously presented, wherein the second object is identified in second markup information of the audio file as associated with the second speech content;
  cause a second updated visual presentation comprising presenting a zoom-out effect that results in visual display of at least the first object associated with the first item and a third object associated with the second item in the item search results, wherein the third object associated with the second item is presented in the second updated visual presentation with the first object associated with the first item based in part on the presentation order indicating that the second item follows the first item, wherein the zoom-out effect is automatically applied when presenting the second updated visual presentation based at least in part on display instructions including executable instructions previously stored by the computing device for use across a plurality of item search requests; and
  cause a third updated visual presentation comprising presenting a zoom-in effect that results in visual display of the third object without display of the first object, wherein the third updated visual presentation is visually presented during audible presentation of third speech content, wherein the third speech content relates to the second item and is identified in third markup information of the audio file as associated with the third object.

2. The system of claim 1, wherein the supporting data includes a uniform resource identifier associated with the audio file, and wherein the audio file is received based on the system requesting the audio file using the uniform resource identifier.

3. The system of claim 1, wherein the first updated visual presentation, the second updated visual presentation, and the third updated visual presentation are each automatically presented in order without receiving any user input during any of the first, second and third updated visual presentations.

4. The system of claim 1, wherein the first object comprises an image of the first item, the second object comprises an attribute of the first item, and the third object comprises an image of the second item.

5. The system of claim 1, wherein the second object comprises a price, rating, review, color, brand, seller or size of the first item.

6. A system comprising:
computer-readable memory storing executable instructions; and
one or more hardware processors in communication with the computer-readable memory and configured by the executable instructions to at least:
receive audio data and supporting data associated with item search results, wherein the audio data includes speech content regarding items in the item search results, wherein the supporting data defines a presentation order of individual items in the item search results, the presentation order comprising at least a first item followed by a second item;
identify first markup information associated with the audio data, wherein the first markup information includes a reference to a first object to be visually presented during playback of first speech content in the audio data, wherein the first speech content describes the first item in the item search results;
based on the first markup information, retrieve the first object from the supporting data, wherein the first object comprises an attribute or media asset associated with the first item;
cause synchronous audible presentation of the first speech content and visual presentation that includes the first object;
identify second markup information associated with the audio data, wherein the second markup information includes a reference to a second object to be visually presented during playback of second speech content in the audio data, wherein the second speech content describes the second item in the item search results;
retrieve the second object from the supporting data, wherein the second object comprises an attribute or media asset associated with the second item;
cause an updated visual presentation comprising simultaneously presenting at least the first object associated with the first item and the second object associated with the second item, wherein the second object is presented with the first object based at least in part on the presentation order indicating that the second item follows the first item in the item search results; and
cause a second updated visual presentation comprising presenting the second object without display of the first object, wherein the second updated visual presentation is visually presented during audible presentation of the second speech content that describes the second item, wherein a visual effect is applied between display of the updated visual presentation and display of the second updated visual presentation, wherein the visual effect is applied based on display instructions including at least one of a display template or executable instructions stored by the system.

7. The system of claim 6, wherein the one or more hardware processors are further configured by the executable instructions to:
receive a user request during the updated visual presentation, wherein the user request comprises a request to hear or view information regarding a next item in the item search results,
wherein the second updated visual presentation is displayed in response to the user request.

8. The system of claim 7, wherein the user request is a spoken utterance captured by a microphone.

9. The system of claim 6, wherein the first item and the second item are products available for purchase.

10. The system of claim 6, wherein the updated visual presentation further comprises display of a third object associated with a third item simultaneously with the display of the first object and the second object.

11. The system of claim 6, wherein the one or more hardware processors are further configured by the executable instructions to:
receive a user request during display of the second object, wherein the user request comprises a question or command regarding the second item; and
in response to the user request, present a third object associated with the second item, wherein display of the second object persists during a time period that begins before display of the third object and continues while the third object is presented.

12. The system of claim 6, wherein the one or more hardware processors are further configured by the executable instructions to:
apply the visual effect with respect to at least one object displayed during each of two or more of: the visual presentation, the updated visual presentation, or the second updated visual presentation.

13. The system of claim 11, wherein the visual effect comprises a moving or zooming effect.

14. The system of claim 11, wherein the visual effect is identified in the display template, wherein the display template is stored by the system prior to receiving the supporting data associated with item search results and is used by the system when presenting item search results for each of a plurality of item search requests.

15. The system of claim 6, wherein the supporting data comprises, for each item in the item search results, a plurality of attribute names and corresponding attribute values.

16. A computer-implemented method comprising: as implemented by one or more computing devices configured with specific executable instructions,
receiving item information regarding each of a plurality of items responsive to a user request, wherein the item information includes a plurality of item attributes, wherein the plurality of items includes at least a first item and a second item; and
presenting a synchronous audible and visual presentation of the item information responsive to the user request, wherein the synchronous audible and visual presentation of the item information is presented based at least in part on supporting data that defines a presentation order of individual items in the item search results, wherein presenting the synchronous audible and visual presentation comprises:

causing a visual presentation that includes display of a first attribute of the first item, wherein the visual presentation is presented during audible presentation of first audible speech content associated with the first attribute;

causing an updated visual presentation that includes display of the first attribute of the first item and simultaneous display of a second attribute of the second item, wherein the second attribute of the second item is included in the updated visual presentation based at least in part on the presentation order indicating that the second item follows the first item; and causing a second updated visual presentation that includes display of the second attribute of the second item without display of the first attribute of the first item, wherein the second updated visual presentation is presented during audible presentation of second audible speech content associated with the second attribute, wherein a visual effect is applied between display of the updated visual presentation and display of the second updated visual presentation, wherein the visual effect is automatically applied without user interaction based on display instructions including at least one of a presentation template or executable instructions associated with the synchronous audible and visual presentation.

17. The computer-implemented method of claim 16, wherein the first attribute comprises a name or description of the first item.

18. The computer-implemented method of claim 16, further comprising generating the first audible speech content as computer-generated speech based on the item information.

19. The computer-implemented method of claim 16, further comprising:
receiving a speech utterance spoken by a user during the synchronous audible and visual presentation; and
determining a responsive action based on (a) content of the speech utterance and (b) contextual information associated with a current position within the synchronous audible and visual presentation at a time of the speech utterance.

20. The computer-implemented method of claim 16, further comprising:
receiving indication of a user interaction with the second updated visual presentation; and
further updating the second updated visual presentation to include additional information regarding the second item.

* * * * *